Nov. 21, 1933.                A. NEVEU                1,935,813
                             AIR STRAINER
                          Filed Aug. 15, 1931

INVENTOR.
ANSELME NEVEU
ATTORNEY.

Patented Nov. 21, 1933

1,935,813

UNITED STATES PATENT OFFICE 1,935,813

AIR STRAINER

Anselme Neveu, Livry-Gargan, France, assignor to The Westinghouse Air Brake Company, Wilmerding, Pa., a corporation of Pennsylvania Application August 15, 1931, Serial No. 557,227, and in France March 21, 1931

4 Claims. (Cl. 183—40)

This invention relates to filter devices for fluids under pressure and more particularly to devices of this character adapted for removing solid or liquid particles such as dust or moisture held in suspension in the air utilized in fluid pressure braking apparatus, the invention having for its object to provide an improved construction of device for this purpose.

According to the principal feature of the invention, the filtering or strainer element of the device is so constructed and arranged that in the event of the element becoming partly or wholly clogged with dust or moisture so as to prevent the relatively free passage through the element of the fluid to be purified, the fluid is automatically permitted to flow through the device without traversing the filter element so as to ensure under all conditions the desired supply of fluid.

According to a further feature of the invention, the filter element is arranged to be readily removable for cleaning or renewal.

Figure 1:
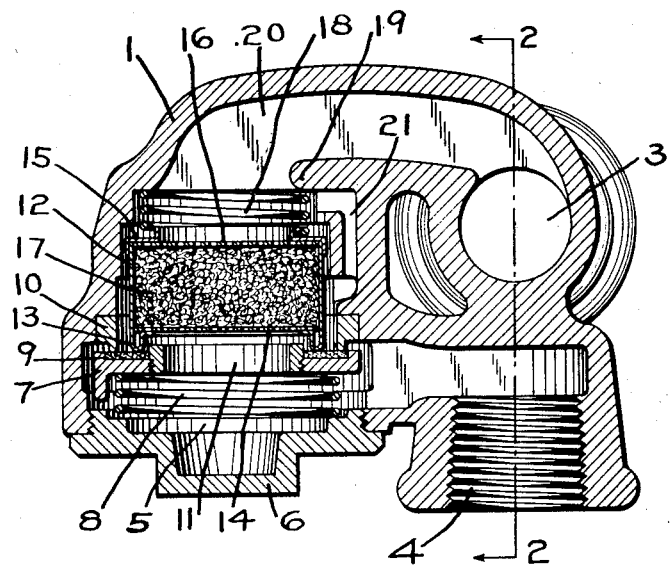

In the accompanying drawing; Fig. 1 is a section on the line 1—1 of Fig. 2, showing a T pipe with my invention embodied therein; and Fig. 2 a partial section on the line 2—2 of Fig. 1.

Figure 2:
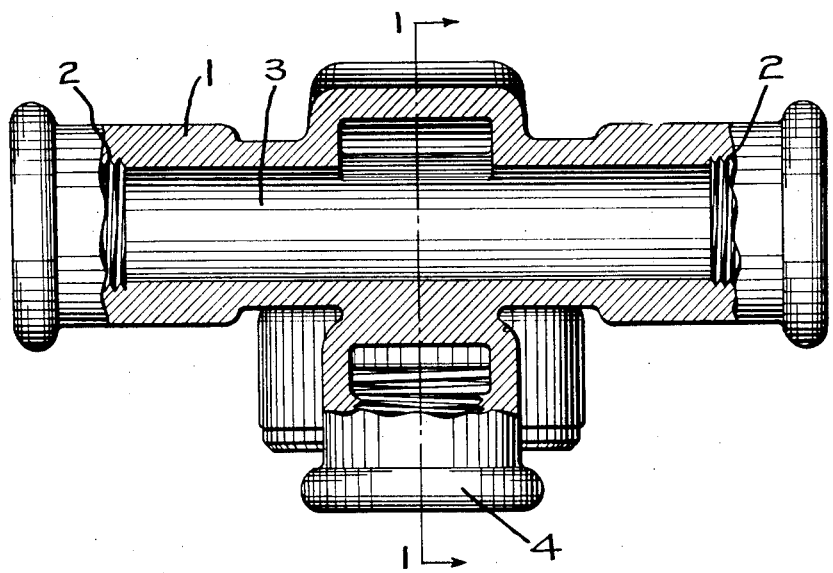

Referring now first to Figures 1 and 2, it will be seen that the device comprises a body or casing 1 having pipe socket projections 2 communicating internally with a passage 3 for establishing a through connection between the portions of the brake pipe (not shown) connected to the socket projections 2. The casing 1 is also provided with a pipe socket projection 4 for connection to a branch pipe leading for example to a triple valve or other device to be supplied with fluid under pressure from the brake pipe. The projection 4 communicates within the casing 1 with a lower chamber 5, the base of which is closed by a screw-threaded plug 6. Located in the chamber 5 is an annular collar 7 between which and the plug 6 a coil spring 8 is interposed, the upper face of the collar 7 being provided with an annular gasket 9. The latter is normally adapted to be held by the spring 8 in engagement with a ring 10 secured to the casing 1 so that communication between the chamber 5 and the upper portion of the casing 1 is only permitted through the central aperture 11 in the collar 7.

The filter or strainer element comprises a cylindrical box 12 having its lower edge turned inwards to form a flange 13 upon which is supported a perforated disc 14. The upper edge of the box 12 is provided with a flanged collar 15 between which and the upper edge of the box 12 a second perforated disc 16 is interposed. The box 12 contains a quantity of filtering material 17 such for instance as hair, and a light spring 18 is interposed between the collar 15 and an internal shoulder 19 formed in an upper passage 20 in the casing 1 leading to the passage 3.

The flange 13 of the box 12 abuts against the gasket 9 of the collar 7 and a passage 21 establishes communication between the passage 20 and the space surrounding the box 12.

The operation of the device is as follows:

So long as the filtering material 17 is capable of permitting the flow of air therethrough, the parts of the device occupy the position shown in Figure 1, air flowing either to or from the brake pipe passage 3 from or to the branch pipe connection 4 by way of passage 20 through the perforated disc 16, the filtering material 17, the perforated disc 14 and the chamber 5.

In the event however of the material 17 becoming partly or wholly clogged with dust or moisture so as to offer considerable resistance to the flow of air through the material, the box 12 containing this material will be displaced upwards or downwards.

If the pressure in the branch pipe connection 4 exceeds the pressure in the brake pipe passage 3 so as to cause a flow of air from the branch pipe to the brake pipe, the pressure in the chamber 5 acting upon the disc 14 and the clogged material 17 will cause the box 12 to move upwards, compressing the light spring 18. The flange 13 will thus be raised out of engagement with the gasket 9 and air will be permitted to pass from the branch pipe connection 4, through chamber 5 and passage 21 to the passage 20 and brake pipe passage 3 without traversing the filtering material 17.

If on the other hand, the pressure in the brake pipe exceeds that in the branch pipe, the brake pipe pressure in the passage 20 acting upon the perforated disc 16 will cause the box 12 to move downwards, carrying with it the collar 7 and compressing the spring 8. The gasket 9 will thus be lowered out of engagement with the ring 10 and air will be permitted to flow from the brake pipe passage 3 to the branch pipe connection 4 by way of passages 20 and 21 and chamber 5 without traversing the filtering material 17.

By removing the plug 6, the box 12 can be readily removed and the material 17 cleansed or renewed.

The invention is evidently not limited to the particular constructional form above described and illustrated which may be modified in various respects without exceeding the scope of the invention.

Having now described my invention, what I claim as new and desire to secure by Letters Patent, is:

1. In a filter device for filtering fluid under pressure, the combination with a casing, of a receptacle containing a filtering material mounted in said casing and through which fluid under pressure normally flows, opposing springs acting on said receptacle, a valve movable by the movement of said receptacle in one direction to open a communication from one side of said receptacle to the other, said receptacle being movable in the opposite direction to also open a communication from one side to the other.

2. In a filter device for fluid under pressure, the combination with a casing, of a movable filter element mounted in said casing, through which fluid is normally filtered, and means operated upon movement of said element in either direction from the normal position for opening communication for the flow of fluid around said element.

3. In a filter device for fluid under pressure, the combination with a casing, of a movable filter element mounted in said casing, through which fluid is normally filtered, a movable valve member on which said element normally seats, said element being movable by fluid under pressure from its seat on the valve member to open a communication for the flow of fluid around said element in one direction, and said element being movable by fluid under pressure to move said valve member and open a communication for the flow of fluid around said element in the opposite direction.

4. In a filter device for fluid under pressure, the combination with a casing, of a movable filter element mounted in said casing and movable in either one direction or the opposite direction from the normal position by the flow of fluid when the filter becomes clogged, according to the direction of flow of fluid through the device and means operated upon movement of said element in either direction for opening communication for the flow of fluid around said element.

ANSELME NEVEU.